(12) United States Patent
Wright

(10) Patent No.: US 8,978,290 B2
(45) Date of Patent: Mar. 17, 2015

(54) LUMINOUS INSECT TRAP

(76) Inventor: William Wright, Burtonsville, MD (US)

( * ) Notice: Subject to any disclaimer, the term of this patent is extended or adjusted under 35 U.S.C. 154(b) by 588 days.

(21) Appl. No.: 13/450,835

(22) Filed: Apr. 19, 2012

(65) Prior Publication Data

US 2012/0266519 A1    Oct. 25, 2012

Related U.S. Application Data

(60) Provisional application No. 61/517,627, filed on Apr. 22, 2011.

(51) Int. Cl.
| A01M 1/08 | (2006.01) |
| A01M 1/10 | (2006.01) |
| A01M 1/02 | (2006.01) |
| A01M 1/14 | (2006.01) |
| A01M 1/24 | (2006.01) |

(52) U.S. Cl.
CPC .................. *A01M 1/103* (2013.01); *A01M 1/02* (2013.01); *A01M 1/145* (2013.01); *A01M 1/24* (2013.01); *A01M 1/106* (2013.01)
USPC .............................................. 43/113; 43/114

(58) Field of Classification Search
USPC ................................................... 43/113, 114
See application file for complete search history.

(56) References Cited

U.S. PATENT DOCUMENTS

| 5,301,456 | A | 4/1994 | Jobin et al. | |
| 6,134,826 | A * | 10/2000 | Mah | 43/112 |
| 6,920,716 | B2 * | 7/2005 | Kollars et al. | 43/114 |
| 7,841,131 | B2 * | 11/2010 | Nelson | 43/113 |
| 8,028,467 | B2 * | 10/2011 | Bagnall et al. | 43/113 |
| 8,341,873 | B2 * | 1/2013 | Frisch | 43/113 |
| 2003/0089024 | A1 * | 5/2003 | Nelson et al. | 43/113 |
| 2007/0175085 | A1 | 8/2007 | Chen | |
| 2009/0293341 | A1 | 12/2009 | Fleming | |
| 2010/0175307 | A1 | 7/2010 | Gotschi | |
| 2010/0263260 | A1 * | 10/2010 | Engelbrecht et al. | 43/113 |
| 2011/0283599 | A1 * | 11/2011 | Wu et al. | 43/113 |

OTHER PUBLICATIONS

The Patriot News, Lancaster County man develops stink bug trap, Aug. 6, 2011.

* cited by examiner

*Primary Examiner* — Christopher P Ellis
(74) *Attorney, Agent, or Firm* — Stuart J. Friedman

(57) ABSTRACT

A luminous insect trap for flying or crawling insects includes a hollow cylindrical enclosure having cylindrical side walls and upper and lower ends, a roof member removably closing the upper end, a removable electrical light source within the enclosure, an electrical power source providing electrical power to the light source, transparent, white or lightly colored, flexible glue boards removably overlying a major portion of the cylindrical walls; a bottom wall including a generally centrally disposed aperture, the aperture being just large enough to allow relatively large insects to pass therethrough, the centrally disposed portion of the bottom wall projecting inwardly into the enclosure for defining an annular space between the inwardly projecting bottom wall and the side walls of the enclosure, and a plurality of wall apertures spaced apart about the periphery of the cylindrical walls just below the bottom of the roof member.

17 Claims, 3 Drawing Sheets

US 8,978,290 B2

LUMINOUS INSECT TRAP

CROSS-REFERENCE TO RELATED APPLICATIONS

This is a non-provisional application based upon U.S. provisional application Ser. No. 61/517,627, filed Apr. 22, 2011, now pending.

FIELD OF THE INVENTION

The present invention relates to luminous insect capture devices, such as traps, and, more particularly, to an insect trap which utilizes white or light colored surfaces, concentrated scents and light as insect attractants.

BACKGROUND OF THE INVENTION

Several types of insects are either resistant to chemicals or are primarily susceptible to chemicals which are dangerous to people and/or crops. Therefore, when insects of this type gain access to the living spaces in the home, the use of chemicals to rid the home of these insects is not a healthy or viable alternative. In these cases, it has been found desirable to combat these insects outside the home, before they gain entry. Where chemicals can be safely used around the home or around crops, they provide one solution to insect control. However, where no chemicals are available to combat the insects, it is desirable to provide some sort of insect trap, which generally includes an attractant for enticing the insects into or near the trap and means for killing the insects or at least preventing them from leaving the trap.

Recently, many areas of the United States have become infested by the brown marmonated stink bug, an insect which is harmless to humans (except for the foul odor it emits when crushed) but which can be devastating to the agricultural industry, as these stink bugs destroy crops. Presently, there are no chemicals approved by the appropriate governmental agencies for combating the stink bugs and for preventing them from ravaging crops.

The insect capture device of the present invention has been demonstrated to be effective in trapping and killing stink bugs and other insects outside the living spaces of the home, thus reducing the problem of stink bugs and other insects reaching the inside living spaces of the home. It also is effective, when emplaced within crop fields, to attract, trap and kill stink bugs and other insects which would otherwise destroy crops.

DETAILED DESCRIPTION OF THE INVENTION

Figure 2:
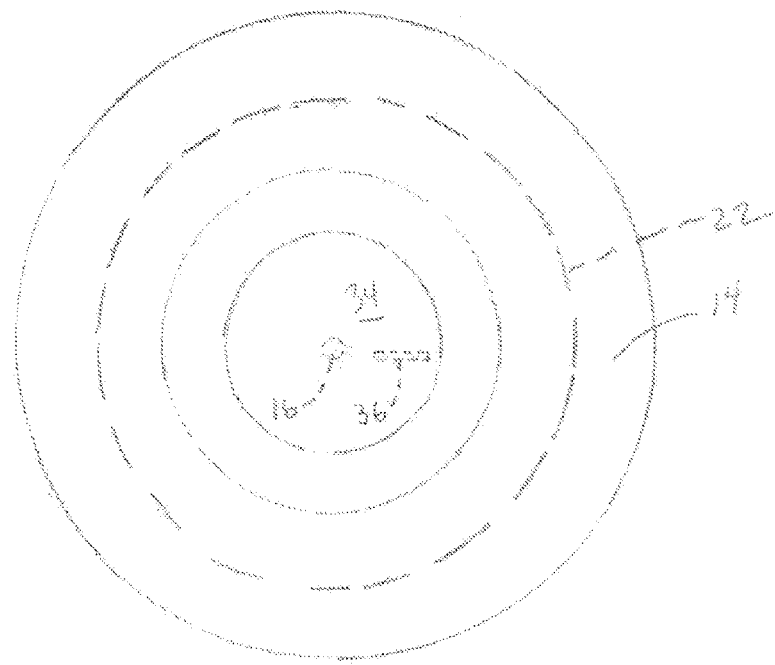
FIG. 2 is a top plan view of the luminous insect trap of FIG. 1.
Figure 1:
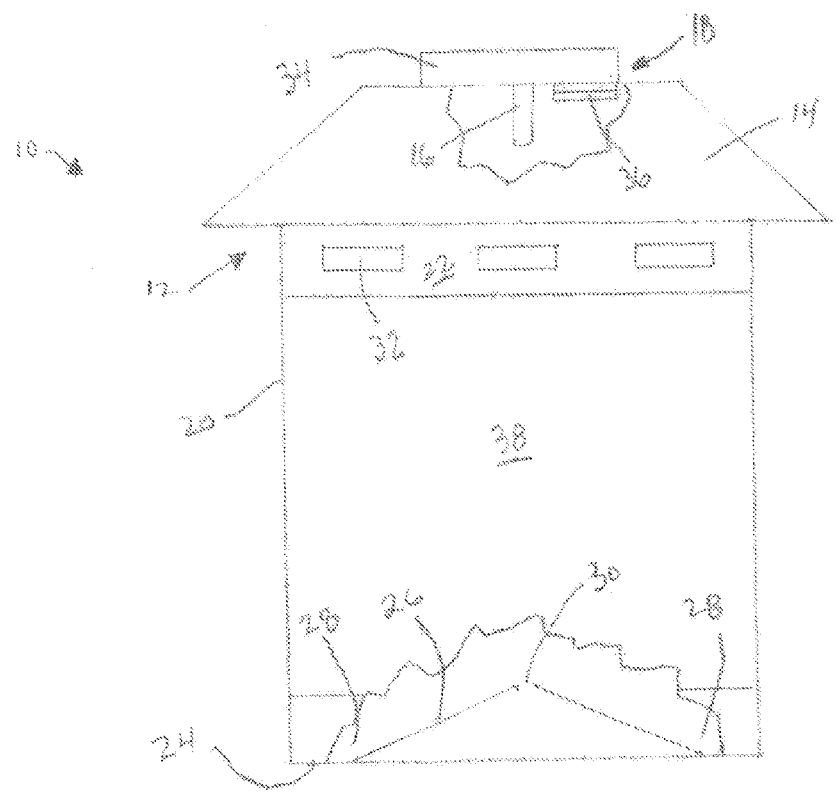
FIG. 1 is a front elevational view, with portions broken away, of a first embodiment of the luminous insect trap of the present invention.

Referring to FIGS. 1 and 2, there is shown the luminous insect trap 10 of the present invention, which includes a housing 12 having a protective roof member 14 removably mounted atop the housing 12, an electrical light source 16 mounted within the housing 12 and electrical power source means 18, such as a solar cell supported by or separate from housing 12 for charging rechargeable batteries for supplying power to light source 16. Housing 12, in one embodiment of the invention, comprises a cylindrical, hollow enclosure 20 having a cylindrical side wall 22, a generally conical roof member 14 closing the open top of the cylindrical enclosure and a substantially closed bottom 24. The generally conical or frustoconical roof member 14 projects radially outwardly and downwardly from its upper end and extends a sufficient distance beyond the perimeter of the cylindrical wall 22 to act as a rain shield to protect the cylindrical wall 22 from rain, snow or falling debris and to minimize rain run-off onto the cylindrical wall 22. A generally centrally disposed portion 26 of the bottom 24 of housing 12 projects inwardly into the enclosure 20 for defining an annular space 28 between the walls of the inwardly projecting bottom portion 26 and the cylindrical side wall 22 of the enclosure 20. The shape of the inwardly projecting portion 26 is not critical and may be conical, substantially conical, cylindrical, or any other desired shape so long as it defines annular space 28 with the cylindrical wall 22 of the enclosure 20. An aperture 30 is formed at or near the innermost projection of the bottom 24 within the enclosure 20 through which insects may access the interior of enclosure 20. The bottom aperture 30 is large enough to allow relatively large insects, such as stink bugs, to pass through but is sufficiently small to prevent insects from easily escaping from the interior of the enclosure 20. When the trap 10 is initially installed, the user may fill a portion of the annular space 28 with a liquid comprising an attractant for stink bugs and other insects, such as a commercially available concentrated fruit scent known to be appealing to such insects, such as peach or apple. It is also recommended to add a small amount of a concentrated soap, such as a dishwashing detergent, to the liquid attractant. Housing 12 also includes a plurality of wall apertures 32, preferably horizontally elongated openings, spaced apart about the periphery of the cylindrical wall 22 at a location just below the bottom of the roof 14. These wall apertures 32 provide access openings through which insects may enter the interior of housing 12 and through which light from electrical light source 16 may escape the enclosure 20. Inasmuch as insects, such as stink bugs, are attracted to light colored objects and, as will be discussed hereinafter, it is desirable to attract the insects to the glue board covered cylindrical wall 22 of enclosure 20, the wall 22 is desirably white or light in color, formed of a thin, lightweight plastic and preferably transparent or semi-transparent to light. Inasmuch as the roof 14 of enclosure 20 includes no insect trapping means, such as glue boards or sheets, it is not desirable to attract the insects to the protective roof 14 of enclosure 20. For this reason, the portions of the roof 14 not covered by the solar cells 34 are desirably dark in color.

Electrical light source 16 is desirably a light emitting diode (LED) of relatively high brightness. LEDs have many advantages over traditional electric light sources, including lower energy consumption, longer lifetime, improved robustness, minimal heat generation, smaller size and faster switching. Nevertheless, traditional light sources such as incandescent bulbs, fluorescent bulbs, and the like, would be functional in the luminous insect trap of the present invention. The electrical light source 16, in addition to providing light during hours of darkness, acts as an attractant to many types of insects, such as stink bugs. Protective roof member 14 includes at least one solar cell 34 mounted thereon for supplying electrical power to the electrical light source 16. For this purpose, protective roof member 14 may be frusto-conical in shape and the solar cell 34 may be mounted centrally along the upper planar surface of the roof member 14. Electrical light source 16 is desirably mounted, together with rechargeable batteries 36 (e.g., two rechargeable AA batteries), within protective roof member 14. In this manner, a user can easily access the LED 16 and the batteries 36 by disconnecting the roof member 14 from enclosure 20. Typically, roof member 14 and enclosure 20 are removably attached in any conventional manner, such as by external threads (not shown) along the upper rim of the enclosure 20 engaging internal threads (not shown) along the lower inside edge of the roof member 14 or by inverted L-shaped slots (not shown) in the lower edge of the roof member 14 cooperating with radially directed pins (not shown) on the upper end portion of the enclosure 20 to effect a bayonet-type locking of the roof member 14 to the enclosure 20. In the preferred form of the invention, solar cell 34 charges rechargeable batteries 36 during daylight hours for use by the electrical light source 16 whenever it is lit. Alternatively, electrical power source means 18 may be rechargeable batteries charged from an AC source and inserted into the luminous insect trap when the trap is to be used or means 18 may be a direct plug-in into an AC source. The electrical circuitry required for using any of these electrical light sources is well known and will not be discussed here.

One or more flexible glue boards or sheets 38 are removably affixed to cylindrical side wall 22 and surround and removably overlie at least a portion, and preferably, a major portion, up to substantially all, of the surface area of the cylindrical side wall 22 below the wall apertures 32 and above the bottom edge of the side wall. The flexible glue boards or sheets 38 may be held in place by any known means such as retaining clips, double-sided adhesive tape, and the like. Most desirably, the flexible glue boards or sheets 38 comprise a stack of flexible glue boards or sheets, arranged as a pad, with one glue board or sheet atop another. One face of each glue board or sheet is tacky whereas the other face may be a material to which the tacky side of the underlying glue board or sheet will not stick, such as release paper to which peel off labels or stamps are typically affixed. Alternatively, each glue board or sheet can have one tacky side and one non-tacky side and a sheet of release paper can be interleaved between individual glue boards or sheets. With a pad comprising a number of glue boards or sheets 38 affixed to the outer surface of the cylindrical wall 22, such as by double sided adhesive tape attached to the cylindrical wall 22 and to the underside of the bottom glue board or sheet of the pad, as each glue board or sheet 38 becomes covered with insects trapped thereon, the covered glue board or sheet 38 may be stripped off of the pad, exposing a clean, tacky glue board or sheet 38 for use. When the entire glue board or sheet pad has been used, it can be replaced with another such pad or, depending upon availability, the entire cylindrical enclosure 20 can be disconnected from the protective roof member 14 and replaced. Depending upon the diameter of the enclosure 20, it may develop that the length of the glue board or sheet 38 necessary to encircle the cylindrical wall 22 is cumbersome and difficult to handle. For example, an enclosure which is two feet in diameter would require a glue board or sheet of more than six feet in length. In such cases, a number of glue boards or sheets or glue board or sheet pads of lesser length (e.g., 18" in length) can be attached to the outer surface of the cylindrical wall 22 in side-by-side relationship to cover substantially the entire circumference of the cylindrical wall 22. In one form of the invention the glue boards or sheets 38 are white or light colored in order that the stink bugs or other insects are attracted to the white or light colored surfaces thereof. In a preferred form of the invention, the glue boards or sheets are sheets of transparent plastic film, one face of which is tacky from a layer of transparent glue applied thereto and the opposite face is a material to which the tacky side of the glue board or sheet will not stick, through which the light from light source 16 is visible.

Figure 4:
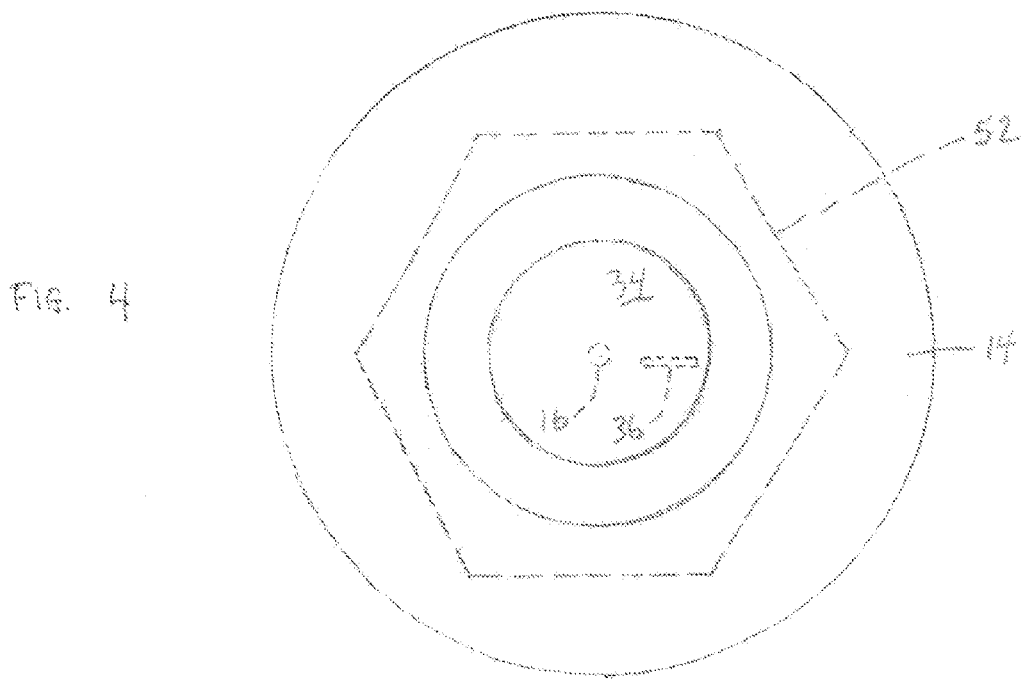
FIG. 4 is a top plan view of the luminous insect trap of FIG. 3.
Figure 3:
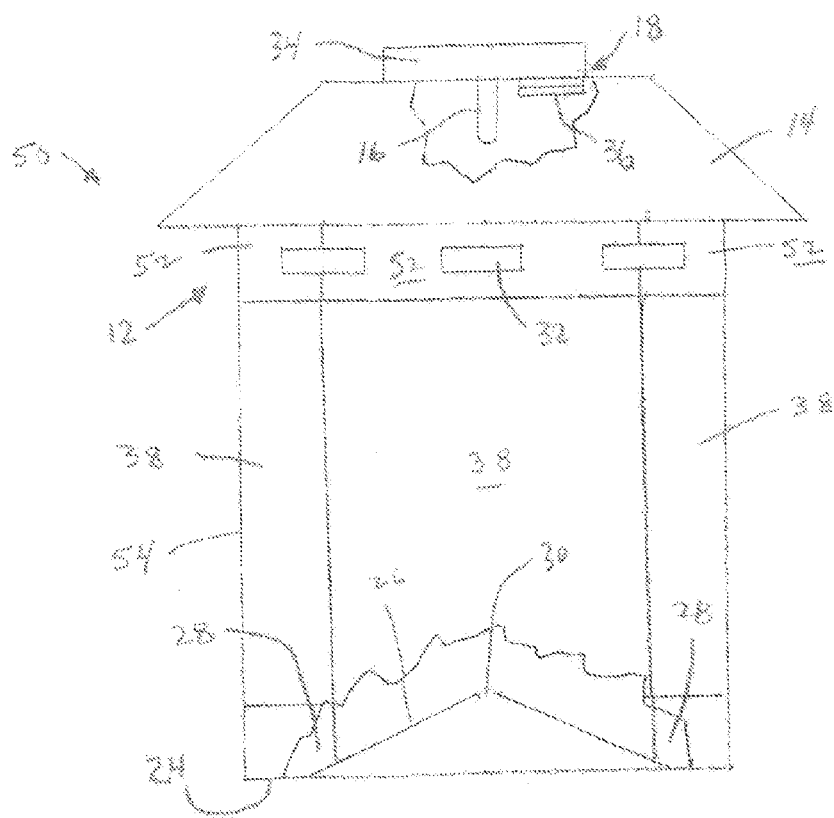
FIG. 3 is a front elevational view, with portions broken away, of a second embodiment of the luminous insect trap of the present invention.

To avoid difficulties in attaching glue boards or sheets 38 to a cylindrical wall surface, it may be advantageous in some circumstances to form the enclosure 20 in a cross-sectional shape other than circular, in order to provide a number of adjacent flat walls to which glue boards or sheets 38 or glue board or sheet pads may be affixed. FIGS. 3 and 4 illustrate a luminous insect trap 50 which is hexagonal in cross-section for this purpose. In this embodiment, six separate glue boards or sheets 38 or glue board or sheet pads are attached along each wall 52 of the hexagonal cross-section to provide substantially continuous glue board or sheet coverage around the perimeter of enclosure 54 of trap 50. The remaining features of trap 50 are identical to the correspondingly numbered features of trap 10. It will be appreciated that the enclosure 54 may have any desired shape which presents flat surfaces for attachment of glue boards or sheets 38, e.g., rectangular, pentagonal, and other polygonal shapes.

In operation, the user typically mounts the trap 10, 50 outdoors on a post embedded in the ground near the structure or area to be protected, hung from the gutters or sides of the structure, hung from trees near the structure or area to be protected, or in any other way. The protective roof member 14 is disconnected from the enclosure 20, 54 and a small amount of liquid comprising an attractant for stink bugs and other insects, such as a commercially available concentrated fruit scent desirably combined with a small amount of a detergent, is poured into the annular space 28 in the enclosure 20, 54. The protective roof member 14 is then re-attached to the enclosure 20, 54, any protective covering on the glue board(s) or sheet(s) 38 is removed and the trap 10, 50 is ready for use. During daylight hours, the solar cell 34 charges rechargeable batteries 36 for supplying power to LED 16 whenever it is lit. In this connection, as is well known in the art, if desired, a daylight sensor may be electrically connected to the LED to limit its operation to night time hours only. Alternatively, a timer may be electrically connected for this purpose. With LED 16 powered by the batteries 36 providing light visible through the side apertures 32 as well as through the white, transparent or semi-transparent enclosure walls 22, 52, the light acts as an attractant for the stink bugs and other insects. At the same time, the aroma of the concentrated fruit scent in the annular space 28 at the bottom of the enclosure 20, 54 provides another attractant for the stink bugs and other insects. As the insects approach the trap 10, 50, they try to gain access to the light and the scent attractant. They either do not perceive the glue boards or sheets 38 surrounding the enclosure walls 22, 52 or are attracted to their white or light color and, as a result, a great many become stuck to the glue boards or sheets 38. Others, avoid the glue boards or sheets 38 and fly into the interior of the enclosure 20, 50 through apertures 30, 32, are stunned when they strike the interior walls and fall into the liquid in the annular space 28, from which they cannot escape. Still others cannot find their way out of the enclosure 20, 54, crawl around the inside of the enclosure 20, 54 and, because, the interior walls are desirably smooth and slippery, eventually slip and fall into the liquid in the annular space 28. A distinct advantage of this trap 10, 50 is that stink bugs which become attached to the glue boards or sheets 38 or are trapped in the liquid within annular space 28 are not crushed and, therefore, do not emit their characteristic noxious odor. After a few days, the glue boards or sheets 38 are substantially covered with stink bugs or other insects and/or the liquid in the annular space 28 is likewise full. At this point, the user can strip the insect-covered glue board(s) or sheet(s) 38 from the pad, exposing a clean tacky glue board or sheet 38, and/or disconnect the protective roof member 14 from the enclosure 20, 54, pour out the liquid and insects in the annular space 28, refill the annular space 28 with liquid fruit scent and detergent and reconnect the protective roof member 14 to the enclosure 20, 54. The trap 10, 50 is now again ready for use.

Figure 5:
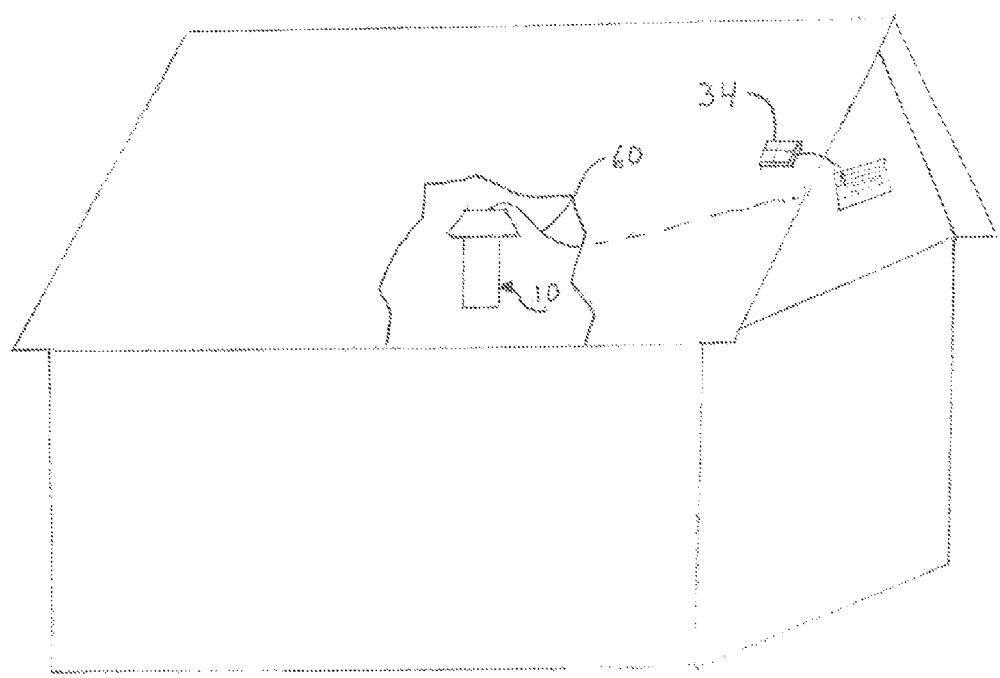
FIG. 5 is a rear elevational view of a house showing one manner of mounting the luminous insect trap of the present invention within the attic of the house.

In another manner of operation, the solar cell 34 is removable from roof member 14 while remaining electrically connected to the batteries 36 and LED 16 via an elongate electrical conductor 60. In this manner, as can be seen in FIG. 5, the trap 10, 50 may be mounted within the non-living spaces in the house, such as in an attic, garage, basement, etc., while the solar cell 34 is mounted on the roof or other sunlight-receiving area on the exterior of the house or on a post near the house.

The invention claimed is:

1. A luminous insect trap for flying or crawling insects comprising:
   a transparent or semi-transparent hollow enclosure having peripheral side walls and opposite, spaced apart upper and lower ends;
   a roof member removably closing the upper end of the enclosure;
   a removable electrical light source within the enclosure;
   an electrical power source and circuit means electrically connected to said light source for providing electrical power thereto;
   flexible glue boards or sheets removably overlying at least a major portion of the side walls of the enclosure;
   a bottom wall substantially closing the lower end of the enclosure and including a generally centrally disposed aperture formed therein communicating with the interior of the enclosure, said aperture being just large enough to allow relatively large insects to pass therethrough, the generally centrally disposed portion of the bottom wall projecting inwardly into the enclosure for defining an annular space between the inwardly projecting bottom wall and the side walls of the enclosure, said annular space adapted for receiving therewithin a liquid comprising an attractant for insects and concentrated liquid soap; and
   a plurality of wall apertures spaced apart about the periphery of the side walls at a location just below the bottom of the roof member.

2. A luminous insect trap, as claimed in claim 1, wherein said side walls are white or light colored for attracting insects thereto.

3. A luminous insect trap, as claimed in claim 2, wherein said glue boards or sheets are transparent, white or light colored for attracting insects thereto.

4. A luminous insect trap, as claimed in claim 3, wherein said glue boards or sheets cover substantially all of the surface area of the side walls below the wall apertures and above the bottom edges of the side walls.

5. A luminous insect trap, as claimed in claim 3, wherein said flexible glue boards or sheets comprise a stack of flexible glue boards or sheets arranged as a pad with one glue board or sheet atop another.

6. A luminous insect trap, as claimed in claim 5, wherein said pads comprise flexible glue boards or sheets having one tacky face and an opposite face which will not stick to the underlying glue board or sheet.

7. A luminous insect trap, as claimed in claim 3, wherein said electrical power source comprises a solar cell and rechargeable batteries for charging by said solar cell.

8. A luminous insect trap, as claimed in claim 3, wherein said electrical light source comprises a light emitting diode (LED).

9. A luminous insect trap, as claimed in claim 3, wherein said roof member comprises a generally conical or frustoconical roof which projects radially outwardly and downwardly from its upper end and extends beyond the perimeter of the side walls for protecting the side walls and the attached flexible glue boards or sheets from rain, snow and falling debris.

10. A luminous insect trap, as claimed in claim 9, wherein said electrical power source comprises a solar cell and rechargeable batteries for charging by said solar cell, said electrical light source comprises a light emitting diode (LED), said batteries and said light emitting diode are mounted within said roof member and said solar cell is mounted on the outside of said roof member.

11. A luminous insect trap, as claimed in claim 9, wherein said electrical power source comprises a solar cell and rechargeable batteries for charging by said solar cell, said electrical light source comprises a light emitting diode (LED), said batteries and said light emitting diode are mounted within said roof member, said solar cell is mounted separate and spaced from said trap and includes an elongate electrical conductor for electrically connecting said solar cell to said batteries and light emitting diode.

12. A luminous insect trap, as claimed in claim 3, wherein any portion of said roof member not covered by said electrical power source is dark in color so as not to attract insects thereto.

13. A luminous insect trap, as claimed in claim 1, wherein said enclosure is cylindrical having cylindrical side walls.

14. A luminous insect trap, as claimed in claim 1, wherein said enclosure is polygonal having a plurality of flat side walls.

15. A luminous insect trap, as claimed in claim 1, wherein said enclosure is formed of a thin, lightweight plastic.

16. A luminous insect trap, as claimed in claim 1, wherein said plurality of wall apertures are horizontally elongate.

17. A luminous insect trap for flying or crawling insects comprising:
   a transparent or semi-transparent hollow cylindrical enclosure having cylindrical side walls and opposite, spaced apart upper and lower ends;
   a roof member removably closing the upper end of the cylindrical enclosure, said roof member comprising a generally conical or frustoconical roof which projects radially outwardly and downwardly from its upper end and extends beyond the perimeter of the side walls for protecting the side walls from rain, snow and falling debris;
   a plurality of wall apertures spaced apart about the periphery of the side walls at a location just below the bottom of the roof member;
   a removable light emitting diode (LED) electrical light source within the enclosure;
   an electrical power source and circuit means electrically connected to said light source for providing electrical power thereto, said electrical power source comprising a solar cell and rechargeable batteries for charging by said solar cell, said batteries and said light emitting diode being mounted within said roof member and said solar cell being mounted on the outside of said roof member;

flexible glue boards or sheets removably overlying substantially all of the surface area of the cylindrical side walls below the wall apertures and above the bottom edges of the side walls, said side walls and said flexible glue boards or sheets being transparent, white or light colored for attracting insects thereto and said portion of said roof member not covered by said electrical power source being dark in color so as not to attract insects thereto; and a bottom wall substantially closing the lower end of the enclosure and including a generally centrally disposed aperture formed therein communicating with the interior of the enclosure, said aperture being just large enough to allow relatively large insects to pass therethrough, the generally centrally disposed portion of the bottom wall projecting inwardly into the enclosure for defining an annular space between the inwardly projecting bottom wall and the side walls of the enclosure, said annular space adapted for receiving therewithin a liquid comprising an attractant for insects and concentrated liquid soap.

* * * * *